United States Patent
Suzuki et al.

(10) Patent No.: US 10,327,049 B2
(45) Date of Patent: Jun. 18, 2019

(54) CABLE AND ELECTRONIC APPARATUS

(71) Applicant: KABUSHIKI KAISHA TOSHIBA, Minato-ku, Tokyo (JP)

(72) Inventors: Nobuaki Suzuki, Tokyo (JP); Takashi Doi, Fuchu Tokyo (JP); Ichiro Tomoda, Hamura Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/826,542

(22) Filed: Nov. 29, 2017

(65) Prior Publication Data

US 2018/0332371 A1 Nov. 15, 2018

(30) Foreign Application Priority Data

May 11, 2017 (JP) .................. 2017-094771

(51) Int. Cl.
*H04Q 11/00* (2006.01)
*H04B 10/80* (2013.01)
*H04B 10/25* (2013.01)

(52) U.S. Cl.
CPC ..... *H04Q 11/0005* (2013.01); *H04B 10/2504* (2013.01); *H04B 10/806* (2013.01); *H04Q 2011/0037* (2013.01)

(58) Field of Classification Search
CPC ........ H04Q 11/0005; H04Q 2011/0037; H04B 10/2504; H04B 10/806
USPC ........................................................ 398/45
See application file for complete search history.

(56) References Cited

U.S. PATENT DOCUMENTS

| | | | |
|---|---|---|---|
| 8,276,005 B2 | 9/2012 | Bae et al. | |
| 8,352,755 B2 | 1/2013 | Bae | |
| 8,862,791 B2 | 10/2014 | Tao et al. | |
| 2003/0132941 A1* | 7/2003 | Echizenya | G09G 5/006 345/520 |
| 2009/0153536 A1 | 6/2009 | Baba et al. | |
| 2015/0074729 A1* | 3/2015 | Kim | H04N 21/4302 725/80 |
| 2018/0143931 A1* | 5/2018 | Miyaoka | G06F 13/38 |

FOREIGN PATENT DOCUMENTS

| | | |
|---|---|---|
| JP | 2009-015041 A | 1/2009 |
| JP | 2010-516075 A | 5/2010 |
| JP | 2010-529771 A | 8/2010 |
| JP | 2011-205164 A | 10/2011 |
| JP | 2012-235344 A | 11/2012 |
| WO | WO 2011/099407 A1 | 8/2011 |

* cited by examiner

*Primary Examiner* — Juan A Torres
(74) *Attorney, Agent, or Firm* — Knobbe, Martens, Olson & Bear, LLP

(57) ABSTRACT

According to one embodiment, a converter is supplied with power from a first or a second electronic apparatus and is configured to convert an electric signal received from the first electronic apparatus into an optical signal. The first and the second transmission lines configured to transmit the electric signal and the optical signal to the second electronic apparatus. The selector is supplied with power from the first or the second electronic apparatus and is configured to select one of transmission of the electric signal via the first transmission line and transmission of the optical signal via the second transmission line, based on an ability to supply the power by the first or the second electronic apparatus.

15 Claims, 10 Drawing Sheets

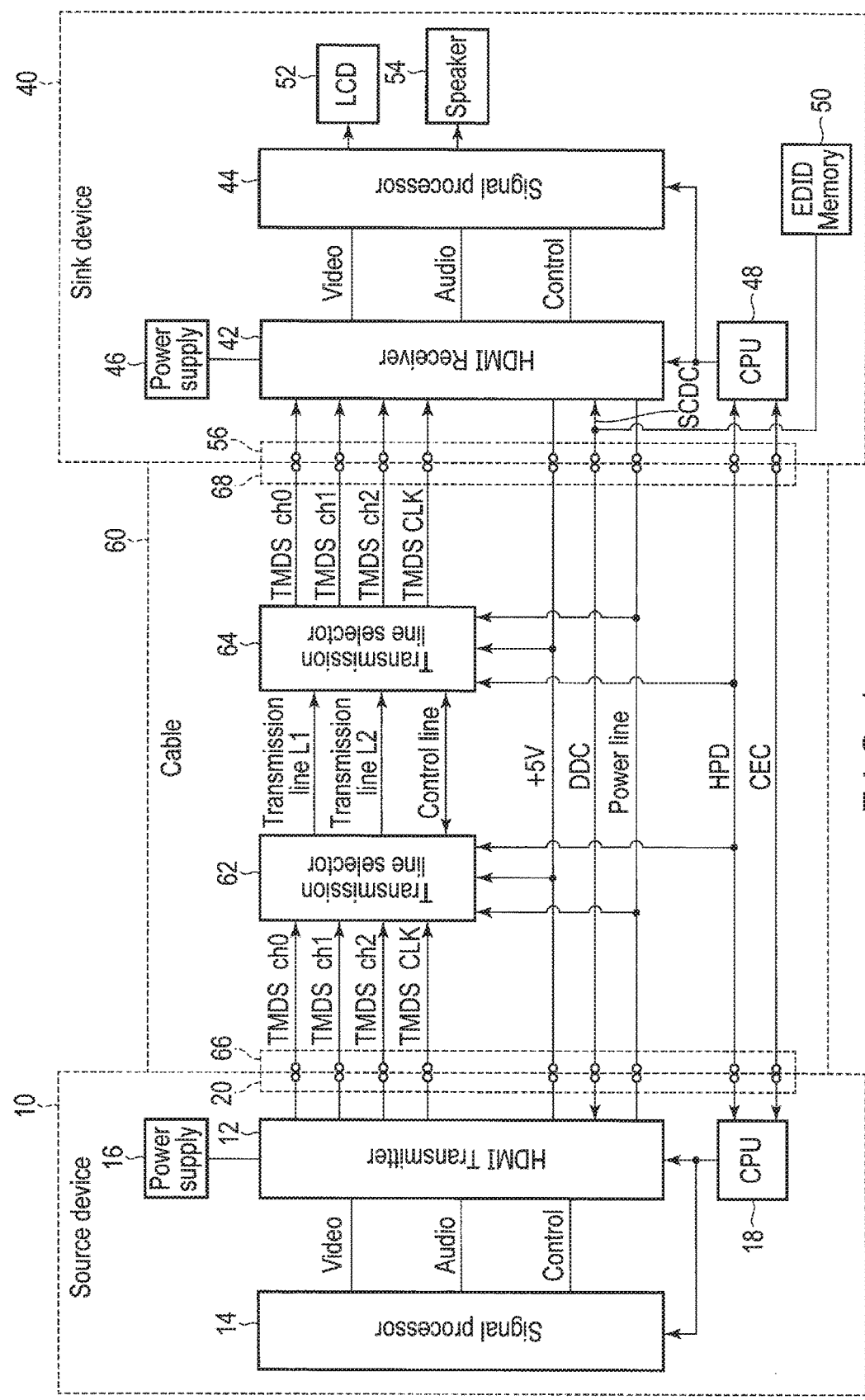
F I G. 1

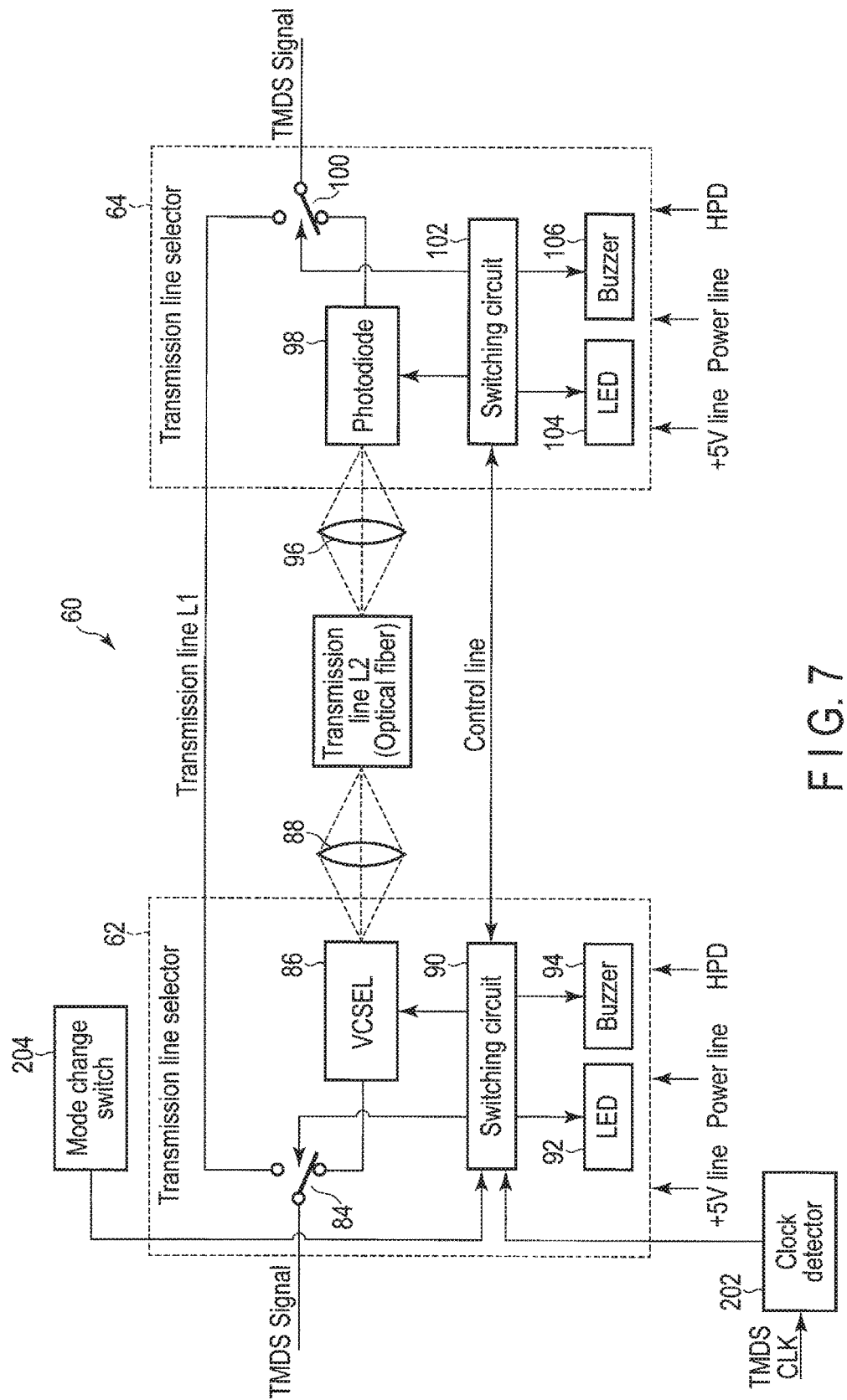
F I G. 7

CABLE AND ELECTRONIC APPARATUS

CROSS-REFERENCE TO RELATED APPLICATIONS

This application is based upon and claims the benefit of priority from Japanese Patent Application No. 2017-094771, filed May 11, 2017, the entire contents of which are incorporated herein by reference.

FIELD

Embodiments described herein relate generally to a cable for transmitting a signal between electronic apparatuses, and an electronic apparatus using the cable.

BACKGROUND

Recently, a cable including a transmission line formed of a metal wire has been often used for signal transmission between electronic apparatuses. For example, High-Definition Multimedia Interface (HDMI; registered trademark) is well known as an interface of transmitting a digital video signal in an Uncompressed format. The HDMI cable transmission line is formed of a copper wire of a twisted line structure. Attenuation of the signal cannot be avoided during the transmission. In a cable including the transmission line formed of a copper wire, an upper limit of the distance in which a 2K digital video signal can be transmitted without error is several meters.

The cable length of several meters is sufficient for 2K video signal transmission. However, a purpose of use of the high-definition video signal such as 4K/8K (hereinafter totally called 8K) is limited by the cable having a length of several meters. A cable having a length of ten or more meters is required to be used for an 8K large television receiver.

An active optical cable (AOC) including a transmission line formed of an optical fiber is well known as a cable capable of transmitting a large amount of signals. To use the optical cable as the transmission line, a laser which converts an electric signal into an optical signal is required on the transmitting side, a photodiode which converts an optical signal transmitted through the optical fiber into an electric signal is required on the receiving side, and a power to drive the elements is required. This power is larger than a power for transmission of a general HDMI cable. Therefore, to implement the HDMI cable using the optical fiber, a power to drive the laser and the photodiode is required. To transmit the signal by the HDMI cable composed of the optical fiber, the electronic apparatus needs to be replaced with an apparatus comprising an ability to supply the power.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram showing an example of an overall system including a cable according to the first embodiment.

FIG. 7 is a block diagram showing an example of the cable according to the second embodiment.

DETAILED DESCRIPTION

Figure 2:
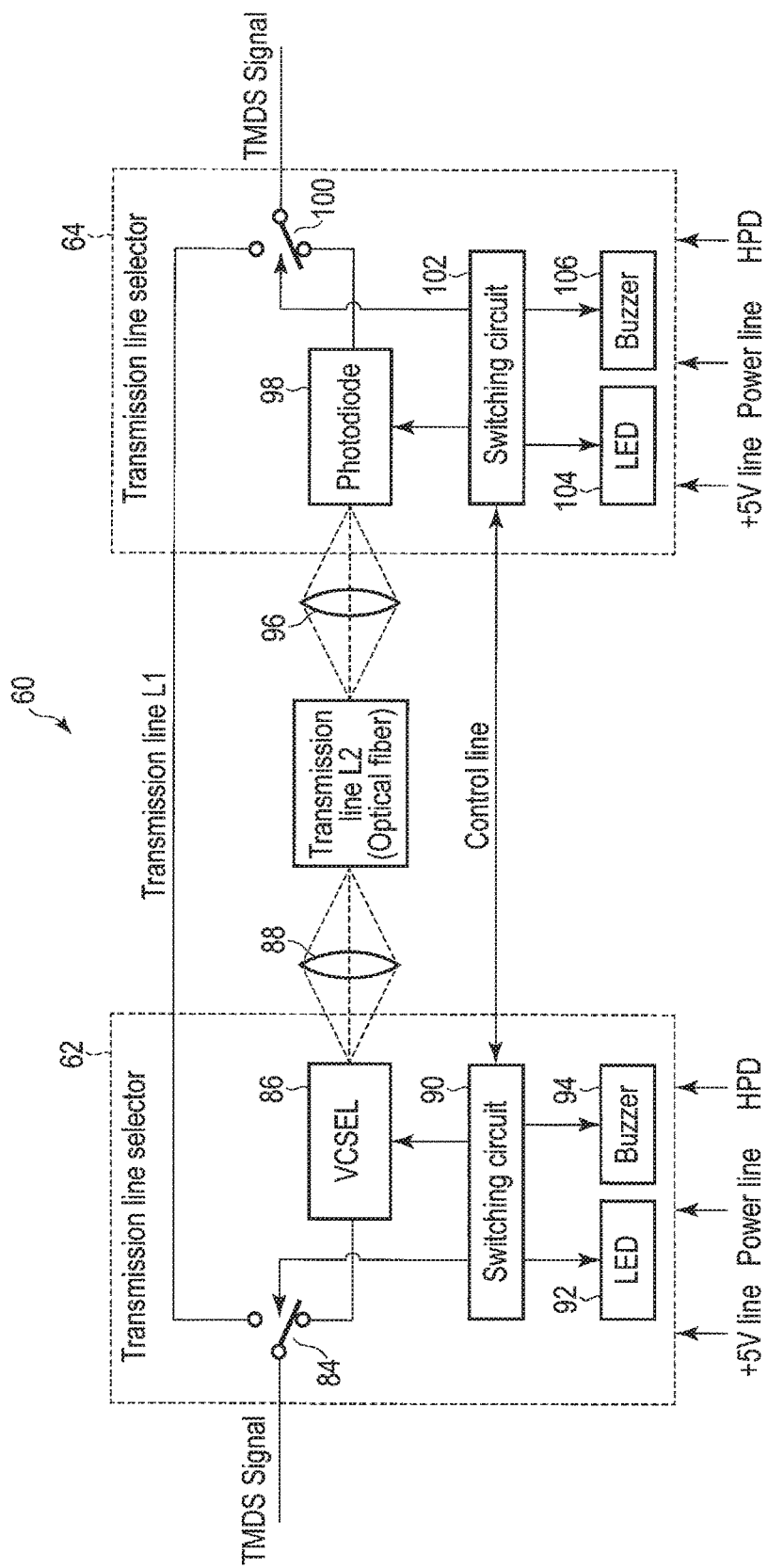
FIG. 2 is a block diagram showing an example of the cable according to the first embodiment.

Various embodiments will be described hereinafter with reference to the accompanying drawings.

In general, according to one embodiment, a cable includes a converter, a first transmission line, a second transmission line, and a selector. The converter is supplied with power from at least one of a first electronic apparatus and a second electronic apparatus and is configured to convert an electric signal received from the first electronic apparatus into an optical signal. The first transmission line is configured to transmit the electric signal to the second electronic apparatus. The second transmission line is configured to transmit the optical signal to the second electronic apparatus. The selector is supplied with power from at least one of the first electronic apparatus and the second electronic apparatus and is configured to select one of transmission of the electric signal via the first transmission line and transmission of the optical signal via the second transmission line, based on an ability to supply power by at least one of the first electronic apparatus and the second electronic apparatus.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

[First Embodiment: System Configuration]

FIG. 1 shows an example of an overall system including a cable according to the embodiment. The system is composed of a transmitter 10 which transmits a video signal, a receiver 40 which receives a video signal, and a digital video signal transmission cable 60 connected between the transmitter 10 and the receiver 40. Various interfaces for transmitting the digital video signal, for example, DisplayPort (registered trademark), HDMI, USB Type-C Alternate mode (registered trademark), Mobile High-Definition Link (MHL) (registered trademark), HD BaseT (registered trademark), VbyOne (registered trademark), Thunderbolt (registered trademark), and the like have been developed. USB Type-C Alternate mode is a mode of transmitting a signal of other standards with a connector/cable of USB Type-C (registered trademark), and includes DisplayPort Alternate mode (registered trademark), MHL Alternate mode (registered trademark), HDMI Alternate mode (registered trademark), Thunderbolt Alternate mode (registered trademark), and the like in accordance with the other standards.

The embodiment does not depend on the type of the interface or the connector/cable of the video signal, but any interfaces and connectors/cables can be used in the embodiment. An HDMI cable will be explained as an example in the first embodiment. In HDMI, a transmitter is called a source device and a receiver is called a sink device. The source device 10 includes an optical disk player, a set-top box, a video camera, a personal computer, a smart phone, and the like. The sink device 40 includes a television receiver, a monitor, a projector, a personal computer, a smart phone, and the like. Connectors 66 and 68 are connected to both ends of the cable 60. The connectors 66 and 68 are detachably connected to connectors 20 and 56 on the device sides. A passive type HDMI cable is bidirectional and can be operated even if each connector is connected to either the source device 10 or the sink device 40. However, since the source side and the sink side of the cable 60 of the embodiment are determined, the connector 66 needs to be connected to the connector 20 of the source device 10 and the connector 68 needs to be connected to the connector 56 of the sink device 40 to normally operate the cable 60.

To prevent an insertion error and connect the connectors 66 and 68 correctly as explained above, the shape, color, size, and the like of the plug accommodating the source side connector 66 may be different from those of the sink side connector 68. Alternatively, a mark representing the source side or the sink side may be attached to the plug or a sheath of an end portion of the cable body near the plug. The identification of the source side and the sink side is also effective for identification of the cable of the embodiment and a cable of an example other than the embodiment since such identification is not applied to the cable of an example other than the embodiment.

The source device 10 includes an HDMI transmitter 12, a signal processor 14, a power supply 16, a CPU 18, and the connector 20. The signal processor 14 supplies a video signal, an audio signal and a control signal (including a status signal) to the HDMI transmitter 12. The signal processor 14 converts a format of the video signal into a format corresponding to the resolution of the sink device 40 and supplies the converted video signal to the HDMI transmitter 12, under control of the CPU 18.

The HDMI transmitter 12 transmits the video signal and the audio signal in Transition Minimized Differential Signaling (TMDS) of four lanes, i.e., TMDS ch0, TMDS ch1, TMDS ch2, and TMDS CLK. The CPU 18 controls the HDMI transmitter 12 and the signal processor 14.

The cable 60 includes a source side transmission line selector 62 and a sink side transmission line selector 64. As explained later, the transmission line selectors 62 and 64 consume a power (for example, 10 W) larger than the power which can be supplied by the source device 10 or the sink device 40 conforming to the HDMI standards. Therefore, the power supply 16 having a power larger than a power source of the general source device 10 is connected to the HDMI transmitter 12.

The sink device 40 includes an HDMI receiver 42, a signal processor 44, a power supply 46, a CPU 48, an Extended Display Identification Data (EDID) memory 50, an LCD display 52, a speaker 54, and the connector 56. The LCD display 52 and the speaker 54 are used not only to display the video, but to notify the user that the cable according to the embodiment is connected. The notification includes text display, icon display, message voice synthesis, notification sound generation, and the like. The cable 60 may supply an identification signal to the sink device 40 by TMDS, DDC, CEC signals and the like, for this notification. Since the notification is made for notification of connection of the cable according to the embodiment, the only connection of the cable according to the embodiment is notified but connection of the cable according to an example other than the embodiment may not be notified. If the source device 10 includes notifying means such as a display, a speaker or the like, the user may be notified of the connection of the cable according to the embodiment, on the source device 10 sides. The video signal and the audio signal are supplied from the HDMI receiver 42 to the signal processor 44. The CPU 48 controls the HDMI receiver 42 and the signal processor 44.

A power supply 46 having a power larger than a power supply of the general sink device is connected to the HDMI transmitter 42. The video signal output from the signal processor 44 is displayed on the LCD display 52 and the audio signal is output from the speaker 54.

Since the power output from the power supplies 16 and 46 and supplied to the transmission line selectors 62 and 64 is supplied to the transmission line selectors 62 and 64 by a common line, as explained below, the power is supplied from one equivalent power supply formed by integrating two power supplies 16 and 46 to two transmission line selectors 62 and 64. Therefore, the power supplies 16 and 46 may not be provided in the source device 10 and the sink device 40, respectively, but either of the power supplies may be provided. In other words, either of the source device 10 and the sink device 40 may not supply the power for optical transmission, but may be a device corresponding to a conventional metal wire cable only. If the power supplies 16 and 46 are provided in the source device 10 and the sink device 40, respectively, the power which can be supplied by the two power supplies 16 and 46 may not be equivalent but one of the power supplies 16 and 46 may supply the power larger than the power of the other. The power supplying ability of the source device 10 may be compared with that of the sink device 40 and both of the devices 10 and 40 may supply the power for optical transmission to the cable 60 in accordance with a proportion corresponding to the difference in ability.

The signals TMDS ch0, TMDS ch1, TMDS ch2, and TMDS CLK of four lanes output from the HDMI transmitter 12 are input to the source side transmission line selector 62. The TMDS signal of each lane includes three lines +, −, and shield. The source side transmission line selector 62 may be provided as closely as possible to the connector 66 and may be provided inside the connector 66 if possible. The source side transmission line selector 62 is connected to the sink side transmission line selector 64 by the first transmission line L1, the second transmission line L2, and the control line. The first transmission line L1 and the second transmission line L2 transmit the TMDS signals of four lanes as input to the transmission line selector 62, to the sink side transmission line selector 64. The sink side transmission line selector 64 may also be provided as closely as possible to the connector 68 and may be provided inside the connector 68 if possible.

The number of transmission lines L1 and L2 included in the cable 60 is not limited to two but may be three or more. The transmission lines L1 and L2 may be suitable to transmit video signals of different resolutions. For example, the first transmission line L1 is a line for video signal transmission and may be composed of a metal wire, for example, a copper wire similarly to a general HDMI cable. The second transmission line L2 is a line for transmitting a video signal of higher definition than the signal of the first transmission line L1, for example, an 8K video signal at a high speed, and may be composed of an optical fiber.

The transmission lines may not be composed of different materials. For example, an optical fiber does not need to be necessarily used as the second transmission line L2 and the second transmission line L2 may also be composed of a copper wire similarly to the first transmission line L1. The copper wire for the second transmission line L2 may be tuned so as to be specialized for transmission of an 8K video signal in accordance with the cable length, the signal transmission speed and the resolution. Examples of tuning may connecting an equalizer for correcting a signal deteriorated during the transmission connected to the sink side, connecting a preamplifier for preliminarily preventing signal deterioration to the source side (both also called active cables), and the like. Even a passive cable can implement a cable specialized for transmission of a specific signal by making the impedance and the attenuation frequency characteristic match the transmission signal characteristics.

The transmission line selectors 62 and 64 select any one of the transmission lines L1 and L2, based on the ability to supply a power to the cable 60 by at least one of the source device 10 and the sink device 40. To transmit the signal by the second transmission line L2 composed of the optical fiber, the TMDS signal which is the electric signal transmitted from the HDMI transmitter 12 needs to be converted into an optical signal by a laser oscillator and the optical signal transmitted by the second transmission line L2 needs to be converted into an electric signal by a photodiode. Therefore, to optically transmit the signal by the second transmission line L2, a power larger than the power which can be supplied by the source device 10 or the sink device 40 conforming to the HDMI standards is consumed. The second transmission line L2 is selected if at least one of the source device 10 and the sink device 40 can supply the power necessary for the optical transmission to the cable 60 while the first transmission line L1 is selected if both the devices cannot supply the power necessary for the optical transmission. The cable according to the embodiment can thereby transmit the signal from the device comprising the power supplying ability for optical transmission and can also transmit the signal from the device which does not include the power supplying ability for optical transmission.

The TMDS signals of four lanes output from the source device 10 are transmitted to the sink device 40 in the first transmission line L1 or the second transmission line L2 which is selected by the transmission line selector 62. The signal transmitted from the source device 10 by the first transmission line L1 or the second transmission line L2 is distributed to the TMDS signals TMDS ch0, TMDS ch1, TMDS ch2, and TMDS CLK of four lanes by the transmission line selector 64 and transmitted to the sink device 40.

The HDMI cable 60 includes not only the TMDS signals for video transmission, but +5V line, Display Data Channel (DDC), power line, Hot-Plug-Detect (HPD), and Consumer Electronics Control (CEC) as the control signals. The +5V line, DDC, and the power line are connected between the HDMI transmitter 12 and the HDMI receiver 42.

The +5V line, the power line, and the HPD line are also connected to the transmission line selectors 62 and 64 to supply the power for optical transmission to the transmission line selectors 62 and 64. The +5V line is a power line which is defined by HDMI and which flows a current (at least 55 mA) necessary to read EDID. If a large current flows in this line, a large power to drive the transmission line selectors 62 and 64 may be supplied from the source device 10 or the sink device 40 to the cable 60 by the +5V line.

The power line is a line which is not defined by HDMI and is also a transmission line for supplying the power necessary for operation of the transmission line selectors 62 and 64 in the device in which a large current does not flow to the +5V line. If the +5V line can supply the power necessary for the transmission line selectors 62 and 64, the power line (other than the +5V line) may be unnecessary.

The power may be supplied to the transmission line selectors 62 and 64 by the TMDS signals, without using the transmission line (+5V line or power line) exclusive for power. The sink device 40 includes the power supply 46 of The TMDS lines and can supply the power from the power supply 46 to the transmission line selectors 62 and 64. In this case too, the power line (other than the +5V line) is unnecessary.

The EDID memory 50 stores EDID that is a data set storing information on the function and performance of the sink device 40. EDID also indicates the power supplying ability of the sink device 40. The EDID memory 50 may not be a RAM but may be a ROM or a flash memory. The source device 10 can access the EDID memory 50 by the DDC line and learn about settings recommended by or corresponding to the sink device 40 and the power supplying ability of the sink device 40, based on EDID. The source device 10 transmits the video signal of the video format recommended by the sink device 40 to the sink device 40.

The DDC line also transmits Status and Control Data Channel (SCDC) on which the ability concerning the video transmission of the sink device 40 is transmitted to the source device 10. The ability concerning the video transmission of the sink device 40 also includes the power supplying ability of the sink device 40. Therefore, the source device 10 can also read the SCDC by the DDC line and learn the power supplying ability of the sink device 40.

The CEC line defined for communication between the devices and is connected between the CPUs 18 and 48. By the CEC line, commands can be transmitted to all the devices by one remote controller and, if a status of another device is changed (for example, power on/off), the device setting can be changed automatically.

Under HDMI standards, InfoFrame information is defined as information to identify the type of the video signal from the source device 10 to the sink device 40. The InfoFrame information is transmitted in Data Island Period in a part of a vertical blanking period of a frame or a part of a horizontal blanking period of a scanning line. The power supplying ability of the source device 10 can be included in the InfoFrame information. The source device 10 notifies the cable 60 of the power supplying ability of the source device 10 by the InfoFrame information.

The source device 10 determines whether the device is connected to or disconnected from the sink device 40 by the HPD line. The source device 10 may supply the power for optical transmission to the transmission line selectors 62 and 64 by the HPD line. In this case, the voltage of the HPD line is amplified in the source device 10 or the sink device 40 to generate the power necessary for optical transmission.

The +5V line, the power line, the TMDS signal, and the HPD line are explained as the paths to supply the power from at least one of the source device 10 and the sink device 40 to the transmission line selectors 62 and 64 but the power may be supplied in at least one path.

An example of pin arrangement of the source side connector 66 of the cable 60 is shown in Table 1.

TABLE 1

| Pin | Signal |
|---|---|
| 1 | TMDS ch2 Data (+) |
| 2 | TMDS ch2 Data (shield) |
| 3 | TMDS ch2 Data (−) |
| 4 | TMDS ch1 Data (+) |
| 5 | TMDS ch1 Data (shield) |
| 6 | TMDS ch1 Data (−) |
| 7 | TMDS ch0 Data (+) |
| 8 | TMDS ch0 Data (shield) |
| 9 | TMDS ch0 Data (−) |
| 10 | TMDS CLK(+) |
| 11 | TMDS CLK(shield) |
| 12 | TMDS CLK(−) |
| 13 | CEC |
| 14 | Reserved (N.C.) |
| 15 | DDC Clock (DDC/SCL) |
| 16 | DDC Data (DDC/SDA) |
| 17 | DDC/CEC ground |
| 18 | +5 V |
| 19 | HPD |

[Cable]

FIG. 2 shows an example of a part relating to the signal transmission, of the cable 60. Each of the first transmission line L1 and the second transmission line L2 transmits video signals of four lanes. However, for convenience, FIG. 2 shows only portions relating to the video signal of one of the four lanes. The TMDS signal (TMDS ch0, TMDS ch1, TMDS ch2, or TMDS CLK) of one of the lanes is input to an end of the first transmission line L1 or a vertical cavity surface emitting laser (VCSEL) 86 by a switch 84. The VCSEL 86 generates and modulates a laser in accordance with the TMDS signal which is an electric signal. Thus, the VCSEL 86 converts the electric signal into an optical signal (laser). The laser emitted from the VCSEL 86 is made incident on an end of the second transmission line L2 composed of an optical fiber by a lens 88. Operations of the switch 84 and the VCSEL 86 are controlled by a switching circuit 90. An LED 92 and a buzzer 94 are connected to the switching circuit 90 to notify the user which transmission line is selected. The LED 92 and the buzzer 94 may be provided on not the cable side (inside the transmission line selector 62), but the source device 10 side. In this case, the information indicating which transmission line is selected may be transmitted from the switching circuit 90 to the sink device 40 through the control line, the TMDS line and the like and further transmitted to the source device 10 through the DDC line and the like.

The laser transmitted to the second transmission line L2 and emitted from the other end of the second transmission line L2 is made incident on a photodiode 98 by a lens 96. The photodiode 98 detects the incident laser and converts the optical signal into an electric signal. An output signal of the photodiode 98 or the electric signal transmitted through the first transmission line L1 is selected by a switch 100 and output as the TMDS signal (TMDS ch0, TMDS ch1, TMDS ch2, or TMDS CLK) of one of the lanes. Operations of the switch 100 and the photodiode 98 are controlled by a switching circuit 102. An LED 104 and a buzzer 106 are connected to the switching circuit 102 to notify the user which transmission line is selected. The LED 104 and the buzzer 106 may be provided on not the cable side (inside the transmission line selector 64), but the sink device 40 side. In this case, the information indicating which transmission line is selected may be transmitted from the switching circuit 102 to the sink device 40 by the TMDS line and the like. The LEDs 92 and 104 and the buzzers 94 and 106 to notify the user of a transmission line selection result may be provided on not both of the source side and the sink side, but at least one of the sides.

The switching circuits 90 and 102 are connected to each other by the control line to transmit the information on switching of the transmission line. The switching circuits 90 and 102 may be connected to each other by the DDC, CEC, or HPD line instead of the control line to transmit the information.

The switches 84 and 100, the first transmission line L1, the second transmission line L2, the VCSEL 86, the lenses 88 and 96, and the photodiode 98 are provided for each of four lanes.

Figure 3A:
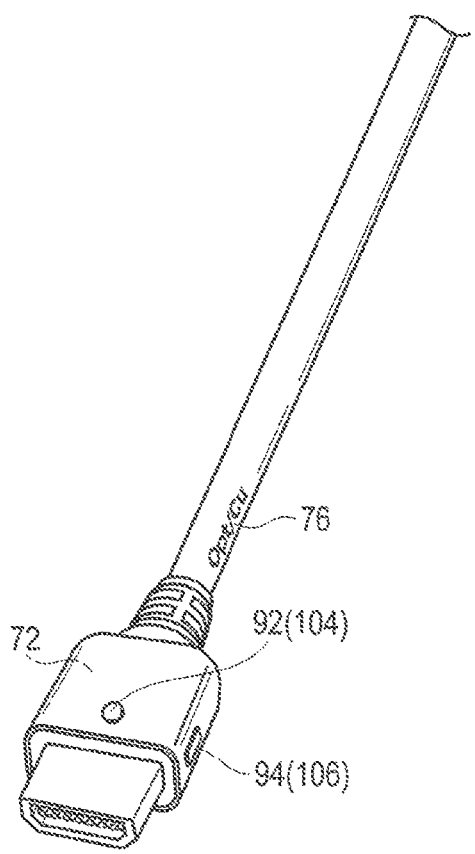
FIG. 3A is a perspective view showing an example of the cable according to the first embodiment.
Figure 3B:
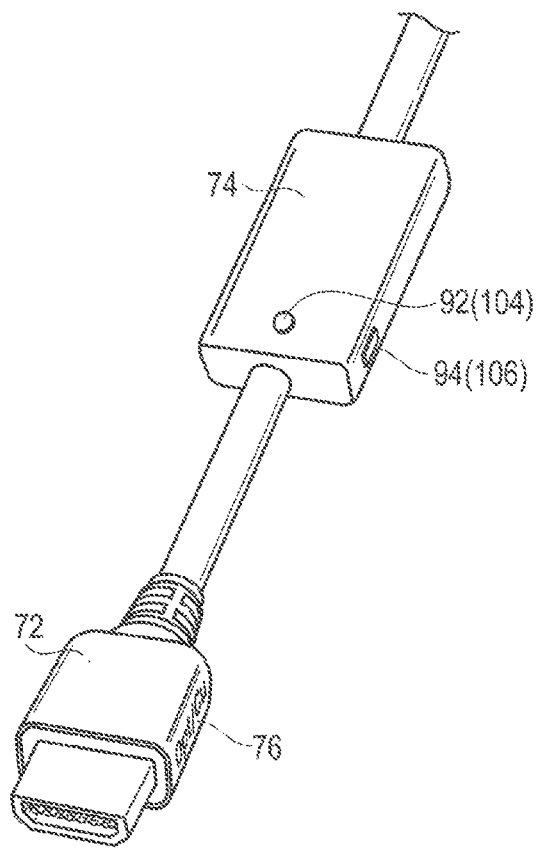
FIG. 3B is a perspective view showing another example of the cable according to the first embodiment.

FIGS. 3A and 3B are perspective views showing an appearance of the cable 60. In the cable shown in FIG. 3A, the transmission line selector 62 and the lens 88 are accommodated in a source side plug 72. On the sink side, too, the transmission line selector 64 and the lens 96 are accommodated in a plug.

In the cable shown in FIG. 3A, the plug may be upsized due to the transmission line selector 62 or 64 and the lens 88 or 96. If upsizing the plug is avoided, a selector unit 74 may be provided near the plug 72 (for example, 5 to 10 cm) and the transmission line selector 62 or 64 and the lens 88 or 96 may be accommodated in the selector unit 74 as shown in FIG. 3B. The LED 92 or 104 and the buzzer 94 or 106 are formed on the surface of the plug 72 or the selector unit 74.

Since the connector of the cable according to the embodiment including the first transmission line composed of a metal wire and the second transmission line composed of an optical fiber is not different from the connector of the cable according to an example other than the embodiment including the first transmission line and not including the second transmission line, both of the cables can hardly be distinguished visually in appearance. To prevent this, a visually recognizable design may be applied to the cable according to the embodiment to distinguish the cable according to the embodiment from the cable according to an example other than the embodiment. An example of the design is a mark (letters Opt/Cu) 76. Different marks may be attached to the cable according to the embodiment and the cable according to an example other than the embodiment. A mark may not be attached to an example other than the embodiment and a mark may be attached to the only cable according to the embodiment. The mark may be attached to at least one of the cable main body (FIG. 3A), the plug 72 (FIG. 3B), and the selector unit 74. The mark may be attached to either or both of the source side end portion and the sink side end portion. The mark may be affixed as a seal or printed. The mark is not limited to a letter but may be a line, a double line, a broken line or the like. The other examples of the design include changing colors, feeling and the like of the cable main body and the plug, forming minute protrusions and design on the cable main body and the plug, and the like.

[Signal Transmission]

When the cable composed of the optical fiber, the cable composed of the metal wire, the electronic device capable of supplying the power for optical transmission, and the electronic device incapable of supplying the power for optical transmission exist together, the signal transmission is often failed if the cable including the optical fiber is connected to the electronic device incapable of supplying the power for optical transmission. Whether the signal transmission is succeeded or failed often cannot be recognized until actually connecting the cable to the electronic device and transmitting the signal.

According to the embodiment, the cable is capable of transmitting a signal from an electronic device which can supply the power for optical transmission and a signal from an electronic device which cannot supply the power for optical transmission.

Figure 4:
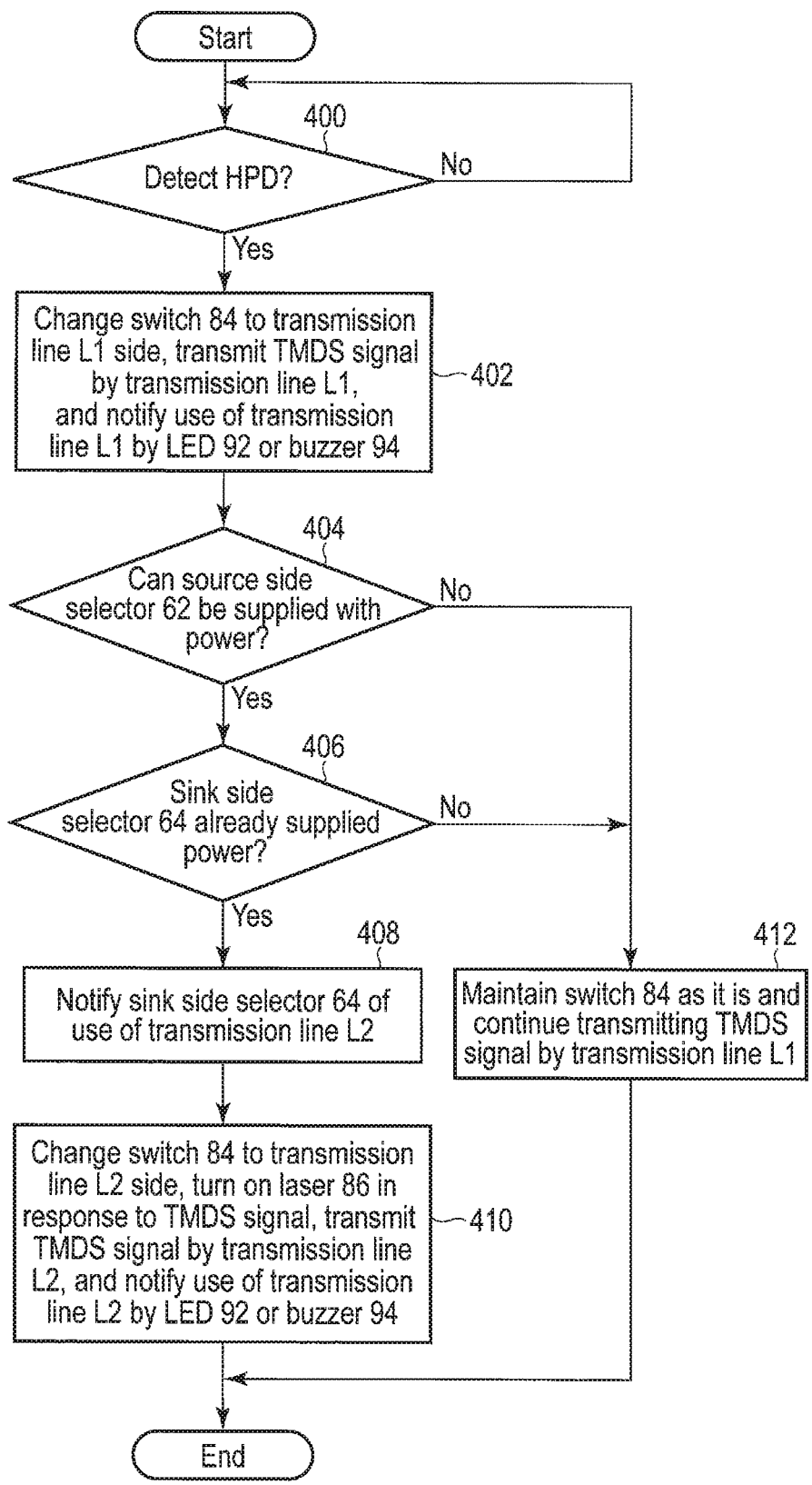
FIG. 4 is a flowchart showing an example of an operation of a source side transmission line selector 62.
Figure 5:
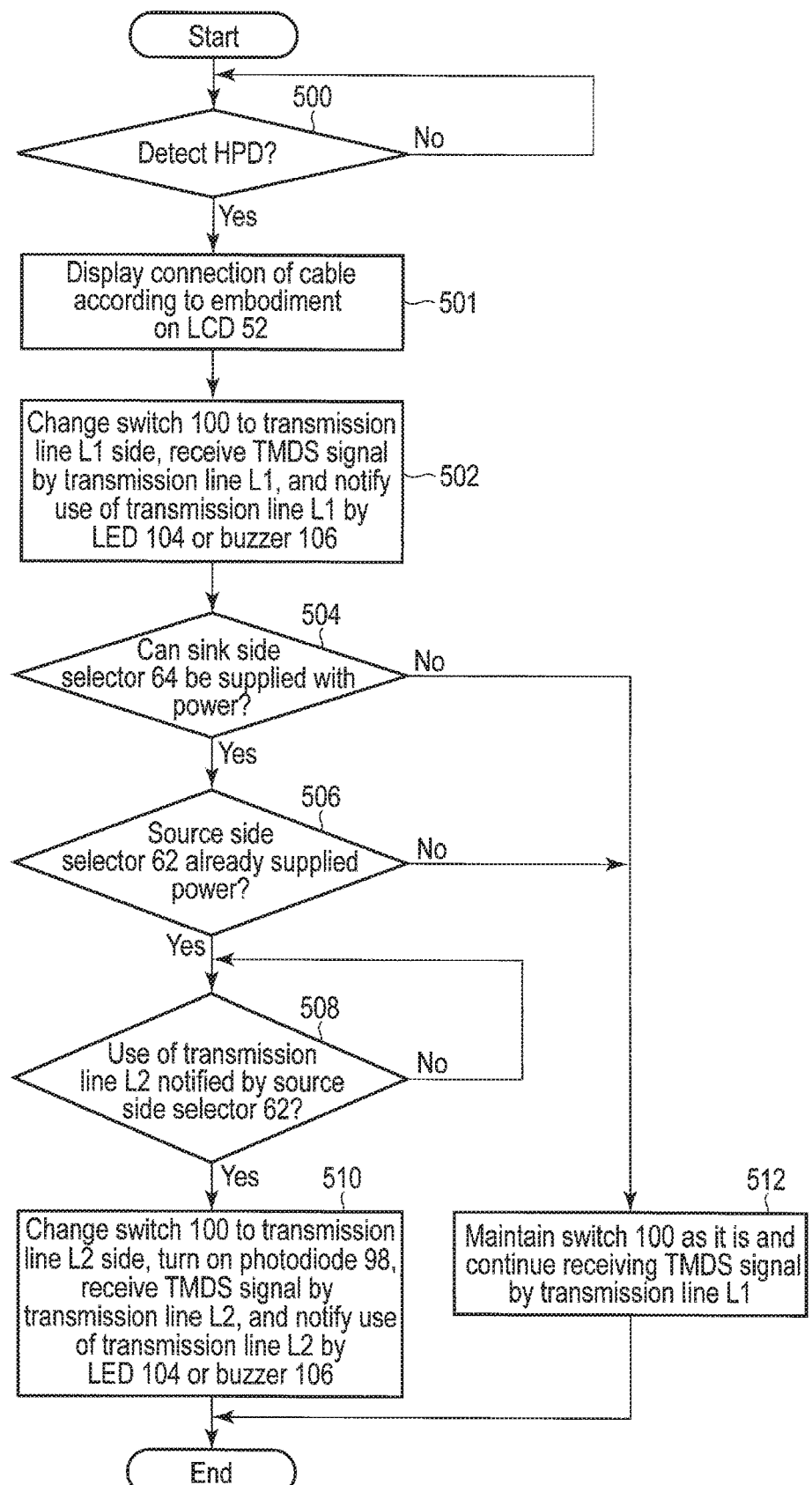
FIG. 5 is a flowchart showing an example of an operation of a sink side transmission line selector 64.

An operation of the cable 60 will be explained with reference to flowcharts of FIG. 4 and FIG. 5. FIG. 4 is a flowchart showing an example of processing of a switching circuit 90 of the source side transmission line selector 62. FIG. 5 is a flowchart showing an example of processing of a switching circuit 102 of the sink side transmission line selector 64.

If the sink device 40 and the source device 10 are connected by the cable 60, the CPU 18 of the source device 10 detects the connection based on the HPD line. As shown in FIG. 4, if the CPU 18 of the source device 10 detects the connection and the switching circuit 90 is notified of the detection of the connection (YES in block 400), the switching circuit 90 changes the switch 84 to the first transmission line L1 side, causes the TMDS signal to be transmitted to the sink device 40 by the transmission line L1, and causes the LED 92 or the buzzer 94 to notify the user of "transmitting the video signal by the first transmission line L1" in block 402. When the transmission line is switched, the sound of the buzzer 94 and the number of times of the sound may be changed for notification in accordance with the transmission line selected. If the notification is executed by the LED 92, LEDs 92 of two colors may be provided and the LED 92 of the color corresponding to the selected transmission line may be urged to emit light. If the notification is executed by one LED, the emitted light color may be changed or the LED may be urged to emit light at the number of times corresponding to the selected transmission line. If the notification is executed by the LED 92, the notification may be continued not only at the switching time, but in the period of the selection. If the LEDs 92 of two colors are provided, the LED 92 of the color corresponding to the selected transmission line may continue emitting light. If the notification is executed by one LED, the emitted light color may be changed or the LED may be urged to blink at intervals corresponding to the selected transmission line.

In block 404, the switching circuit 90 determines whether or not the source side transmission line selector 62 can be supplied with the power necessary for the optical transmission, i.e., a power for driving the VCSEL 86. Since the drive power of the transmission line selector 62 is supplied from at least one of the source device 10 and the sink device 40 by at least one of the +5V line, the power line, the TMDS line and the HPD line, an attempt to supply the power by the lines may be executed and the determination may be executed based on whether the power is actually supplied or not. Alternatively, the determination may be executed based on the amount of the power which can be obtained by communication between the source device 10 and the sink device 40 by the cable 60 and which can be supplied by at least one of the source device 10 and the sink device 40. This communication can be executed by SCDC, InfoFrame, and EDID.

If the power necessary for the optical transmission can not be supplied to the transmission line selector 62 (NO in block 404), the switching circuit 90 maintains the status of the switch 84 as it is and causes the TMDS signal to be continuously transmitted to the sink device 40 by the first transmission line L1, in block 412.

If the power necessary for the optical transmission can be supplied to the transmission line selector 62 (YES in block 404), the switching circuit 90 determines whether the power necessary for the optical transmission has been supplied to the sink side transmission line selector 64 or not, in block 406. The switching circuit 90 may execute this determination after executing communication with the switching circuit 102 and receiving the status information of the transmission line selector 64 from the switching circuit 102.

If the power necessary for the optical transmission is not yet supplied to the sink side transmission line selector 64 (NO in block 406), the switching circuit 90 maintains the status of the switch 84 as it is and causes the TMDS signal to be continuously transmitted to the sink device 40 by the first transmission line L1, in block 412.

If the power necessary for the optical transmission has been supplied to the sink side transmission line selector 64 (YES in block 406), the switching circuit 90 notifies the switching circuit 102 of the sink side transmission line selector 64 of "transmitting the optical signal by the second transmission line L2" by the control line, in block 408. In block 410, the switching circuit 90 changes the switch 84 to the VCSEL 86 (second transmission line L2) side, turns on the VCSEL 86 in accordance with the TMDS signal, causes the TMDS signal to be transmitted to the sink device 40 by the second transmission line L2, and causes the LED 92 or the buzzer 94 to notify the user of "transmitting the video signal by the second transmission line L2", similarly to block 402.

The source side transmission line selector 62 can thus select the second transmission line L2 composed of an optical fiber and transmit the video signal by the second transmission line L2 if the power for the optical transmission can be supplied. The user is notified of which of the first transmission line L1 and the second transmission line L2 has been selected or is selected, by the LED 92 or the buzzer 94 in the cable 60.

As explained with reference to FIG. 4, if the sink device 40 and the source device 10 are connected by the cable 60, the CPU 18 of the source device 10 detects the connection based on the HPD line. As shown in FIG. 5, if the CPU 18 of the source device 10 detects the connection and the CPU 18 notifies the switching circuit 102 of the sink side transmission line selector 64 of the detection of the connection through the HDMI transmitter 12 and the source side transmission line selector 62 (YES in block 500), the switching circuit 102 supplies to the sink device 40, by the TMDS signal, in block 501, a signal causing the LCD display 52 of the sink device 40 to make a visually recognizable display indicating a message that "the cable according to the embodiment and including the first transmission line L1 composed of a copper wire and the second transmission line L2 composed of an optical fiber has been connected" and a signal causing the speaker 54 to generate an auditorily recognizable sound indicating the message that "the cable according to the embodiment and including the first transmission line L1 composed of a copper wire and the second transmission line L2 composed of an optical fiber has been connected". This display may be executed by the above text, an icon indicating the cable including at least two transmission lines, i.e., the copper wire and the optical fiber, or the like. When the sound is generated, the sound may be made recognizable by tone of the sound, duration of the sound, number of times of generation of the sound, and the like or may be made recognizable by synthesized sound of the message.

Since the user can thus recognize the type of the connected cable on the screen of the sink device 40, a connection error of the cable can be prevented and failure in transmission of the video signal can be prevented. A message that "a conventional cable including the first transmission line L1 composed of a copper wire but not including the second transmission line L2 composed of an optical fiber has been connected" may also be displayed if the conventional cable is connected. If the source device 10 also includes a display, a signal to cause the source device 10 to display the message may be output. If this display is not made even by connecting the cable, the user recognizes a status that "a cable according to an example other than the embodiment, for example, a cable including the first transmission line L1 composed of a copper wire but not including the second transmission line L2 composed of an optical fiber has been connected". If the cable according to the embodiment include a plurality of types of cables corresponding to the number of transmission lines, and the like, and if cables according to an example other than the embodiment include a plurality of types of cables, the user may be notified of not only the cables according to the embodiment, but also the types of cables. The notification may be executed by a sound.

In block 502, the switching circuit 102 changes the switch 100 to the first transmission line L1 side, causes the TMDS signal to be received from the source device 10 by the first transmission line L1, and causes the LED 104 or the buzzer 106 to notify the user of "receiving the video signal by the first transmission line L1", similarly to block 402. The user may be notified of "receiving the video signal by the first transmission line L1" by the LCD display 52 or the speaker 54 of the sink device 40 instead of or in addition to the LED 104 or the buzzer 106 in the cable 60. A signal for this notification is transmitted to the sink device 40 by the TMDS signal.

In block 504, the switching circuit 102 determines whether or not the transmission line selector 64 can be supplied with the power necessary for reception of the optically transmitted signal, i.e., a power for driving the photodiode 98. Since the drive power of the transmission line selector 64 is supplied from at least one of the source device 10 and the sink device 40 by at least one of the +5V line, the power line, the TMDS line and the HPD line, an attempt to receive the power supply from the lines may be executed and the determination may be executed based on whether the power is actually supplied or not. Alternatively, the determination may be executed based on the amount of the power which can be obtained by communication between the source device 10 and the sink device 40 through the cable 60 and which can be supplied by at least one of the source device 10 and the sink device 40. This communication can be executed by SCDC, InfoFrame, and EDID.

If the transmission line selector 64 cannot be supplied with the power necessary to receive the optically transmitted signal (NO in block 504), the switching circuit 102 maintains the status of the switch 100 as it is and causes the TMDS signal to be continuously received from the source device 10 by the first transmission line L1, in block 512.

If the transmission line selector 64 can be supplied with the power necessary to receive the optically transmitted signal (YES in block 504), the switching circuit 102 determines whether or not the source side transmission line selector 62 has been supplied with the power necessary to receive the optically transmitted signal, in block 506. The switching circuit 102 may execute this determination after executing communication with the switching circuit 90 and receiving the status information of the transmission line selector 62 from the switching circuit 90.

If the source side transmission line selector 62 is not yet supplied with the power necessary to receive the optically transmitted signal (NO in block 506), the switching circuit 102 maintains the status of the switch 100 as it is and causes the TMDS signal to be continuously received from the source device 10 by the first transmission line L1, in block 512.

If the source side transmission line selector 62 is already supplied with the power necessary to receive the optically transmitted signal (YES in block 506), the switching circuit 102 determines whether or not the switching circuit 102 has been notified of "transmitting the optical signal by the second transmission line L2" from the switching circuit 90 of the source side transmission line selector 62, by the control line, in block 508. This determination is repeated until the notification is received. However, if the notification is not transmitted for a certain period, the operation is ended by time out.

If the switching circuit 102 has been notified of "transmitting the optical signal by the second transmission line L2" from the switching circuit 90 of the source side transmission line selector 62 (YES in block 508), the switching circuit 102 changes the switch 100 to the second transmission line L2 side, turns on the photodiode 98, and causes the TMDS signal to be received from the source device 10 by the second transmission line L2 and, similarly to block 410, notifies the user of "receiving the optical signal by the second transmission line L2" by the LED 104 or the buzzer 106, in block 510. Similarly to block 502, the user may be notified of "receiving the optical signal by the second transmission line L2" by the LCD display 52 or the speaker 54 of the sink device 40 instead of or in addition to the LED 104 or the buzzer 106 in the cable 60.

The sink side transmission line selector 64 can thus receive the video signal by selecting the second transmission line L2 composed of an optical fiber if the power necessary to receive the optical transmission signal can be supplied. The user is notified of which of the first transmission line L1 and the second transmission line L2 has been selected or is selected, by the LED 104 or the buzzer 106 in the cable 60.

The transmission rate is adjusted before video transmission between the source device 10 and the sink device 40 though not shown in FIG. 4 and FIG. 5. First, the source device 10 and the sink device 40 attempt video transmission at a maximum transmission rate. If the transmission is failed, the source device 10 and the sink device 40 repeats attempting the video transmission at the transmission rate lower by one step. If the video transmission at a certain transmission rate is succeeded, the transmission rate is determined.

According to the first embodiment, in the cable including the first transmission line L1 composed of a metal wire and the second transmission line L2 composed of an optical fiber, the switching circuit 90 of the source side transmission line selector 62 is associated with the switching circuit 102 of the sink side transmission line selector 64 by the control line. The first transmission line L1 is selected if the power for optical transmission cannot be supplied to the cable 60 or the second transmission line L2 is selected if the power can be supplied. Therefore, the cable according to the embodiment can transmit the signal from the device comprising the power supplying ability for optical transmission and can also transmit the signal from the device which does not include the power supplying ability for optical transmission.

[Second Embodiment]

The selection and change of the transmission line are based on the power supplying ability of at least one of the source device 10 and the sink device 40, in the first embodiment. However, the transmission line may be selected or switched based on the power supplying ability and the other information. Since the power consumption is large in the optical transmission, the first transmission line L1 composed of a metal wire may be selected from the viewpoint of power consumption even if the source device 10 or the sink device 40 includes the power supplying ability. The second embodiment can be operated in a power saving mode in response to this requirement.

Figure 6:
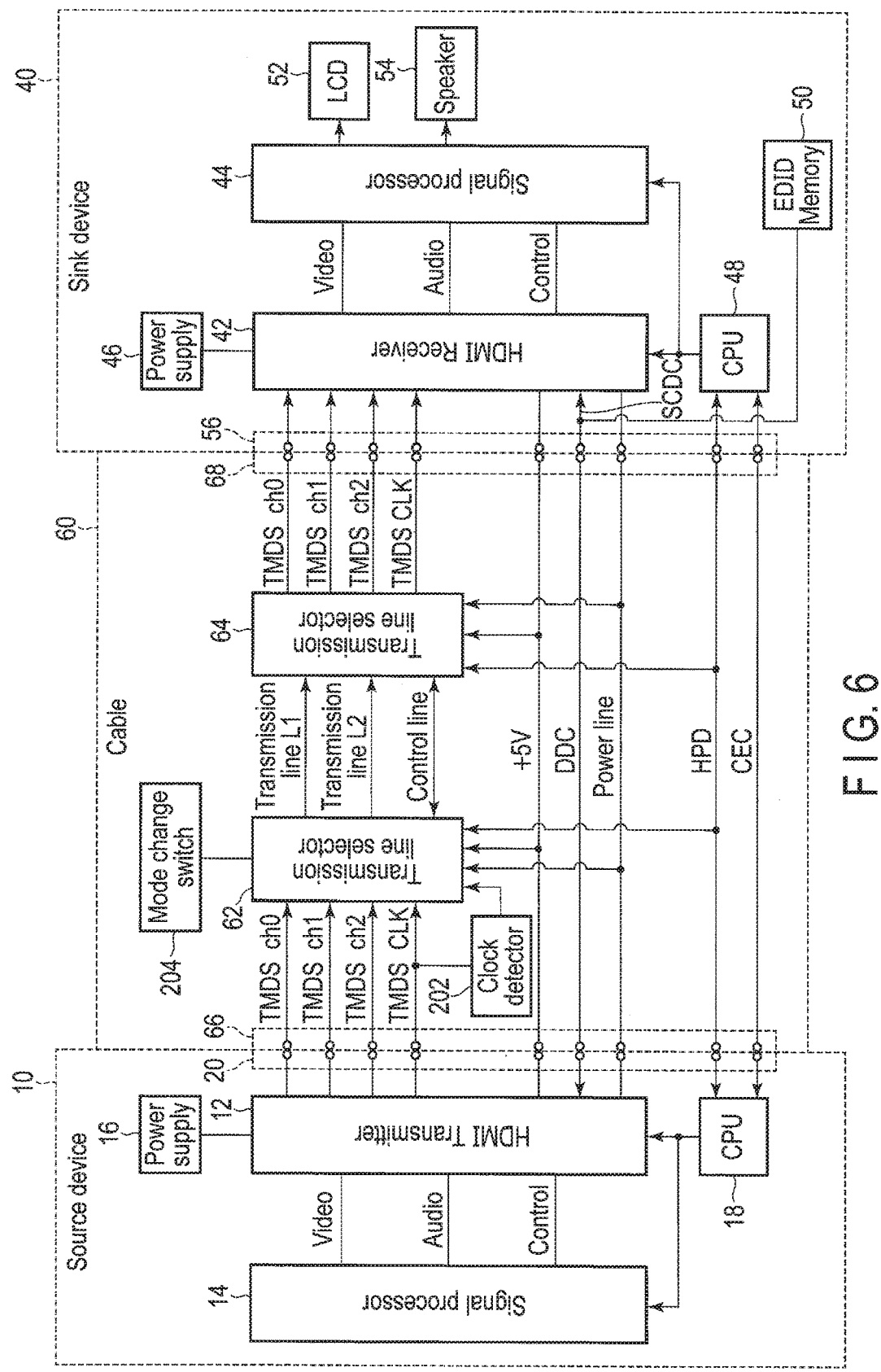
FIG. 6 is a block diagram showing an example of an overall system including a cable according to the second embodiment.

FIG. 6 shows an example of an overall system including a cable according to the second embodiment. FIG. 7 shows an example of a part relating to the signal transmission, of the cable 60 of the second embodiment. The appearance of the cable is substantially the same as that of the second embodiment shown in FIGS. 3A and 3B.

The second embodiment is substantially the same as the first embodiment and is different with respect to a feature that a clock detector 202 and a mode change switch 204 which can be operated by the user are additionally provided near the source side connector 66 in the cable 60. The mode change switch 204 is provided on a surface of the plug or selector unit including the source side connector 66. The clock detector 202 is connected to the clock line TMDS CLK between the source device 10 and the transmission line selector 62 to detect a frequency band of a transmitted video signal. A detection result of the clock detector 202 is input to the transmission line selector 62. The mode change switch 204 is also connected to the transmission line selector 62.

The user can set the operation mode to the general mode or the power saving mode by the mode change switch 204. The general mode is a mode corresponding to the first embodiment, for selecting the transmission line in accordance with the power supplying ability. The power saving mode is a mode for selecting the first transmission line L1 and transmitting a signal by the first transmission line L1 to reduce power consumption even if the power supplying ability is sufficient and the second transmission line L2 can be selected and if the signal can be transmitted by the first transmission line L1. For example, if the device is driven by a battery, the device is required to reduce as much power consumption as possible. In this case, the user operates the mode change switch 204 and designates the power saving mode.

Figure 8:
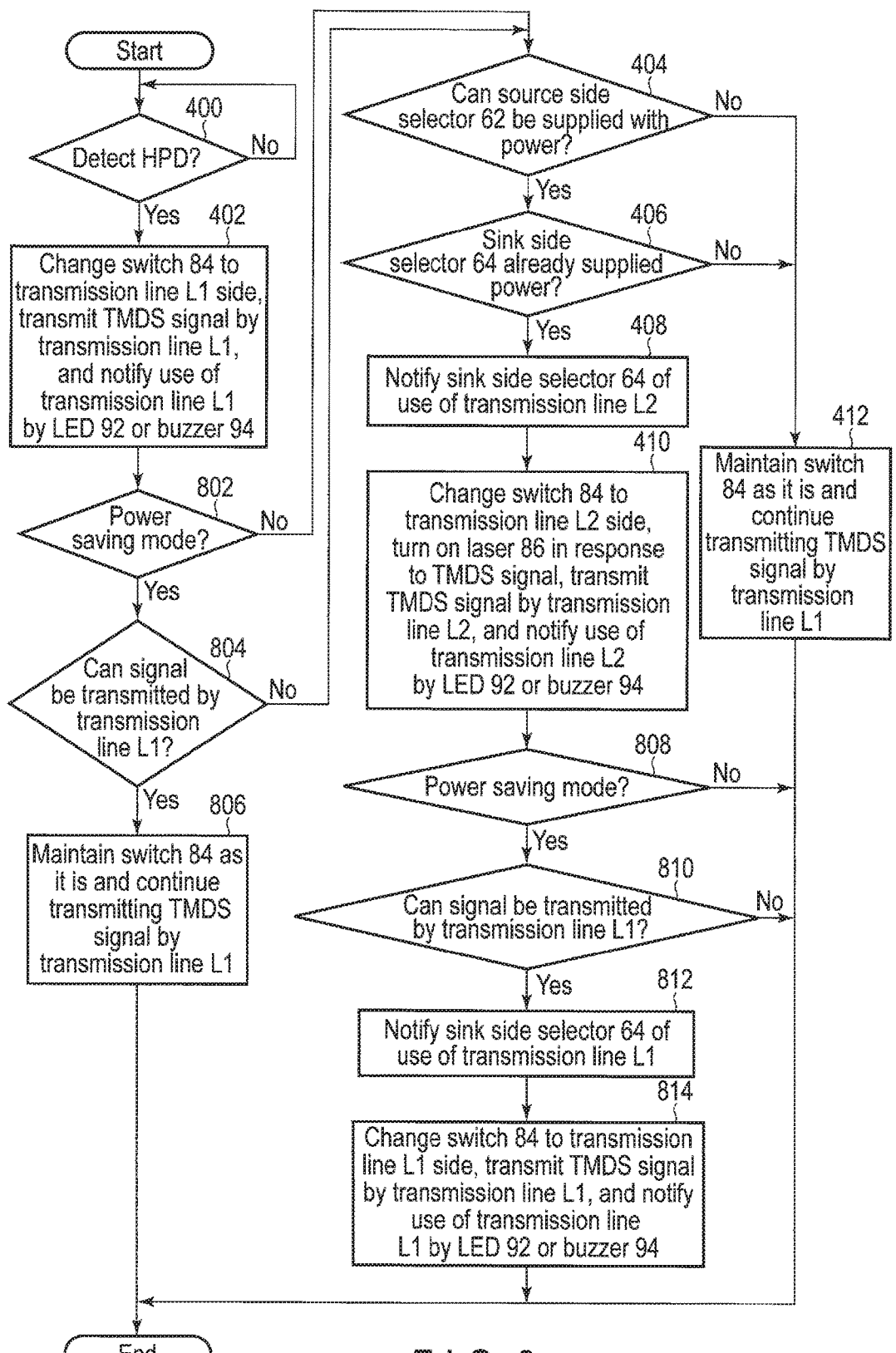
FIG. 8 is a flowchart showing an example of an operation of the source side transmission line selector 62.

An operation of the cable 60 will be explained with reference to a flowchart of FIG. 8. FIG. 8 shows an example of a flowchart indicating processing of the switching circuit 90 of the source side transmission line selector 62. Processing of the switching circuit 102 of the sink side transmission line selector 64 is the same as the processing of the first embodiment shown in FIG. 5.

Similarly to the first embodiment, if the sink device 40 and the source device 10 are connected by the cable 60, the CPU 18 of the source device 10 detects the connection based on the HPD line. As shown in FIG. 8, if the CPU 18 of the source device 10 detects the connection and the switching circuit 90 is notified of the detection of the connection (YES in block 400), the switching circuit 90 changes the switch 84 to the first transmission line L1 side, causes the TMDS signal to be transmitted to the sink device 40 by the transmission line L1, and causes the LED 92 or the buzzer 94 to notify the user of "transmitting the video signal by the first transmission line L1" in block 402.

In block 802, the switching circuit 90 determines whether or not the mode change switch 204 designates the power saving mode. If the general mode is designated (NO in block 802), the processing in blocks 404, 406, 408, 410, and 412 is executed and the transmission line is selected in accordance with the power supplying ability of the source device 10/sink device 40, similarly to the first embodiment. If the power saving mode is designated (YES in block 802), the switching circuit 90 determines whether or not a frequency band of the transmission signal indicated by a detection result of the clock detector 202 is a frequency band in which the signal can be transmitted by the first transmission line L1, in block 804. If the frequency band of the transmission signal is the frequency band which can be transmitted by the first transmission line L1 (YES in block 804), the switching circuit 90 maintains the status of the switch 84 as it is and causes the TMDS signal to be continuously transmitted to the sink device 40 by the first transmission line L1, in block 806, and ends the operation.

For example, if the frequency band which can be transmitted by the first transmission line L1 is several MHz and the frequency band which can be transmitted by the second transmission line L2 is several GHz, the transmission signal in the frequency band of several MHz can be transmitted by the first transmission line L1. If the frequency band of the transmission signal can be transmitted by the first transmission line L1, the signal is transmitted by the first transmission line L1 without using the second transmission line L2 even if the source device 10/sink device 40 includes the power supplying ability necessary for optical transmission. The power consumption of the source device 10/sink device 40 can be thereby reduced.

If the frequency band of the transmission signal can not be transmitted by the first transmission line L1 (NO in block 804), the processing in blocks 404, 406, 408, 410, and 412 is executed, similarly to the first embodiment. In the first embodiment, the transmission via the transmission line L1 is continued in block 412 executed when the power for optical transmission is not supplied, and the user may be notified of the possibility that the transmission may be failed since the frequency band of the transmission signal can not be transmitted by the first transmission line L1, by the LED 92, the buzzer 94, or the LCD 52 or speaker 54 of the sink device 40.

Since it cannot be predicted when the user operates the mode change switch 204, after the signal transmission via the second transmission line L2 is started in block 410, the switching circuit 90 determines again whether or not the mode change switch 204 designates the power saving mode in block 808. If the general mode is designated (NO in block 808), the switching circuit 90 maintains the status of the switch 84 as it is and causes the TMDS signal to be continuously transmitted to the sink device 40 by the first transmission line L1, in block 412, and ends the operation.

If the power saving mode is designated (YES in block 808), the switching circuit 90 determines whether the frequency band of the transmission signal indicated by the detection result of the clock detector 202 is a frequency band in which the signal can be transmitted by the first transmission line L1 or not, in block 810. If the frequency band of the transmission signal is the frequency band in which the signal can be transmitted by the first transmission line L1 (YES in block 810), the switching circuit 90 notifies the switching circuit 102 of the sink side transmission line selector 64 of "transmitting by the first transmission line L1" by the control line, in block 812. In block 814, the switching circuit 90 changes the switch 84 to the first transmission line L1 side and urges the TMDS signal to be transmitted to the sink device 40 by the first transmission line L1.

If the frequency band of the transmission signal is not the frequency band in which the signal can be transmitted by the first transmission line L1 (NO in block 810), the switching circuit 90 maintains the status of the switch 84 as it is and causes the TMDS signal to be continuously transmitted to the sink device 40 by the second transmission line L2 in block 412, and ends the operation.

If the mode change switch 204 is operated in timing other than the above-explained timing, interruption occurs and the processing following block 808 in FIG. 8 is started.

The mode change switch 204 is provided near the source side connector 66 of the cable 60 but may be provided near the sink side connector 68 and connected to the switching circuit 102 of the sink side transmission line selector 64. In this case, the mode designation information output from the mode change switch 204 may be transmitted between the switching circuits 90 and 102 by the TMDS signal, DDC line or CEC line. Furthermore, the mode change switch 204 may be provided in at least one of the source device 10 and the sink device 40.

According to the second embodiment, if the power for optical transmission can be supplied but the signal can be transmitted in the transmission signal band without optical transmission, unnecessary power consumption can be saved by selecting not the optical transmission line but a metallic transmission line.

[Modified Example of Second Embodiment]

The power saving mode is designated by the user operation of the mode change switch 204 but is not limited to this, and the power saving mode may be designated without the user operation of the switch.

For example, the sink device 40 of a battery-driven portable device which may be operated in the power saving mode may include the designation information of the operation mode in the EDID or SCDC. If the source device 10 accesses the EDID memory 50, reads the EDID or reads the SCDC and the power saving mode is designated, the source device 10 may notify the cable 60 of the power saving mode. Since this notification is equivalent to the change of the mode change switch 204 in FIG. 6, determination of the power saving mode in blocks 802 and 808 in the flowchart shown in FIG. 8 is based on this notification.

Alternatively, the source device 10 may designate the operation mode and notify the cable 60 of the power saving mode. As regards a manner for the source device 10 to notify the cable 60 of the power saving mode, the power saving mode may be designated in the InfoFrame information.

Furthermore, the source device 10 and the sink device 40 may designate the operation mode respectively and the cable 60 may determine the operation modes of the devices 10 and 40. If both of the devices 10 and 40 are in the same operation mode, the cable operates in this mode but, if one of the devices is in the general mode and the other is in the power saving mode, the cable 60 may operate in the general mode. However, the power for optical transmission may be supplied from the device in which the general mode is designated, and the power may not be supplied from the device in which the power saving mode is designated.

[Third Embodiment]

The selection and change of the transmission line are based on the power supplying ability of at least one of the source device 10 and the sink device 40 in the first embodiment. The selection and change of the transmission line are based on the operation mode in addition to the power supplying ability in the second embodiment. According to the third embodiment, the transmission line is selected based on the signal characteristics in addition to the power supplying ability.

Figure 9:
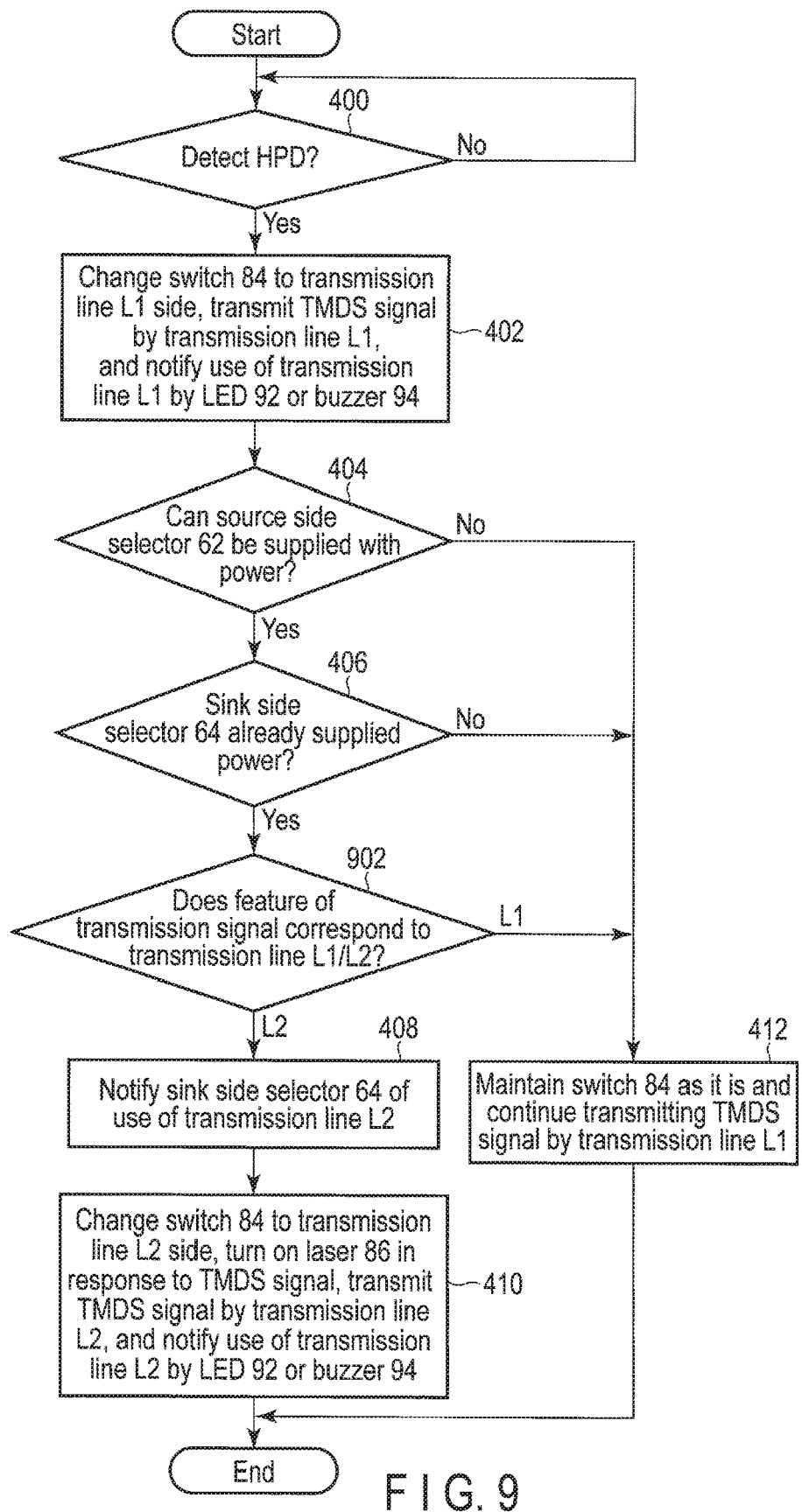
FIG. 9 is a flowchart showing an example of an operation of a source side transmission line selector 62 according to a third embodiment.

An example of an overall system including the cable according to the third embodiment, an example of a portion relating to the cable signal transmission, and the appearance of the cable are the same as those of the first embodiment shown in FIGS. 1, 2, 3A and 3B. FIG. 9 shows an example of a flowchart indicating processing of the switching circuit 90 of the source side transmission line selector 62. Processing of the switching circuit 102 of the sink side transmission line selector 64 is the same as the processing of the first embodiment shown in FIG. 5. The flowchart in FIG. 9 is substantially the same as the flowchart indicating the processing of the switching circuit 90 of the source side transmission line selector 62 according to the first embodiment as shown in FIG. 4. FIG. 9 is different from FIG. 4 with respect to a feature that block 902 is executed after block 406. If it is determined in block 406 that the power necessary for the optical transmission has been supplied to the sink side transmission line selector 64 (YES in block 406), the switching circuit 90 detects a feature of the video signal, and determines whether the feature corresponds to the transmission characteristic of the first transmission line L1 or the transmission characteristic of the second transmission line L2, i.e., whether the transmission line suitable for the signal transmission is the first transmission line L1 or the second transmission line L2, in block 902. If the transmission line suitable for the transmission is determined to be the first transmission line L1, block 412 is executed and, similarly to the first embodiment, the video signal is transmitted by the first transmission line L1. If the transmission line suitable for the transmission is determined to be the second transmission line L2, blocks 408 and 410 are executed and, similarly to the first embodiment, the sink side selector 64 is notified of the use of the second transmission line L2 and the video signal is transmitted by the second transmission line L2.

Examples of features of the video signal include the following.

a. signal frequency
b. signal frequency range
c. signal error rate
d. whether the signal is a DC signal or an AC signal
e. signal transmission mode (USB Type-C Alternate mode)

a. If the transmission line is selected based on the signal frequency, one cable is composed of transmission lines different in transmission frequency characteristics. For example, when the first transmission line L1 is specialized to the signal transmission of several MHz and the second transmission line L2 is specialized to the signal transmission of several GHz, the second transmission line L2 is selected if the signal frequency is several GHz while the first transmission line L1 is selected if the signal frequency is several MHz. The signal frequency can be detected by the clock detector 202 according to the second embodiment shown in FIG. 7.

b. If the transmission line is selected based on the signal frequency band, one cable is composed of transmission lines different in transmission frequency band. For example, when the first transmission line L1 is specialized to the transmission of a 2K video signal and the second transmission line L2 is specialized to the transmission of an 8K video signal, the second transmission line L2 is selected if the signal frequency band is a band of the 8K video signal while the first transmission line L1 is selected if the signal frequency is a band of the 2K video signal. The signal frequency band can be detected by the clock detector 202 according to the second embodiment shown in FIG. 7.

c. If the transmission line is selected based on an error rate of the transmission signal, one cable is composed of transmission lines different in the error rate. The error rate of the transmission signal can be measured by the sink device 40 and the sink device 40 can cause a measured value of the error rate to be included in the EDID. The source device 10 can read the SDCD through the DDC line and learn the error rate of the transmission signal. If the error rate of the transmission signal is large, the transmission line of a smaller error rate, for example, the second transmission line L2 is selected. If the error rate of the transmission signal is small, no problem is caused by selecting the transmission line of a larger error rate, for example, the first transmission line L1, and the transmission line can be selected with respect to the other features without considering the error rate. Therefore, if the error rate of the transmission signal is small, the transmission line of a larger error rate may be selected.

d. The second transmission line L2 is selected if the transmission signal is an AC signal and the first transmission line L1 may be selected if the transmission signal is a DC signal.

e. Since the USB Type-C Alternate mode can transmit any one of signals of USB and the other standards, an appropriate transmission line may be selected in accordance with whether the transmitted signal is the USB signal or the signal of the other standards. For example, an appropriate transmission line can be selected by considering the first transmission line as the transmission line suitable for the USB signal and considering the second transmission line as the transmission line suitable for the signal of the other standards.

[USB Type-C Alternate Mode]

The HDMI is used as the interface and the HDMI signal is transmitted by the HDMI cable in the above embodiments. An example of using a USB Type-C cable which is a cable capable of transmitting the HDMI signal other than the HDMI cable will be hereinafter explained. USB Type-C Alternate modes to transmit signals of the other standards by the USB Type-C connector/cable are defined and one of the modes is HDMI Alternate mode. The HDMI signal can be transmitted by the USB Type-C cable by mapping pins of the USB Type-C cable to the HDMI signal as shown in Table 2 and Table 3.

TABLE 2

| USB Type-C | | HDMI |
|---|---|---|
| Pin | Signal | Signal |
| A1 | GND | TMDS ch1 Data (shield) |
| A2 | TX1+ | TMDS ch1 Data (+) |
| A3 | TX1− | TMDS ch1 Data (−) |
| A4 | VBUS | |
| A5 | CC | CEC/DDC Clock/DDC Data |
| A6 | D+ | |
| A7 | D− | |
| A8 | SBU1 | HPD |
| A9 | VBUS | |
| A10 | RX2− | TMDS ch0 Data (+) |
| A11 | RX2+ | TMDS ch0 Data (−) |
| A12 | GND | TMDS ch0 Data (shield) |

TABLE 3

| USB Type-C | | HDMI |
|---|---|---|
| Pin | Signal | Signal |
| B1 | GND | TMDS CLK (shield) |
| B2 | TX2+ | TMDS CLK (−) |
| B3 | TX2− | TMDS CLK (+) |
| B4 | VBUS | |
| B5 | $V_{CONN}$ | +5 V |
| B6 | | |
| B7 | | |
| B8 | SBU2 | Reserved |
| B9 | VBUS | |
| B10 | RX1− | TMDS ch2 Data (−) |
| B11 | RX1+ | TMDS ch2 Data (+) |
| B12 | GND | TMDS ch2 Data (shield) |

Figures 10A, 10B:
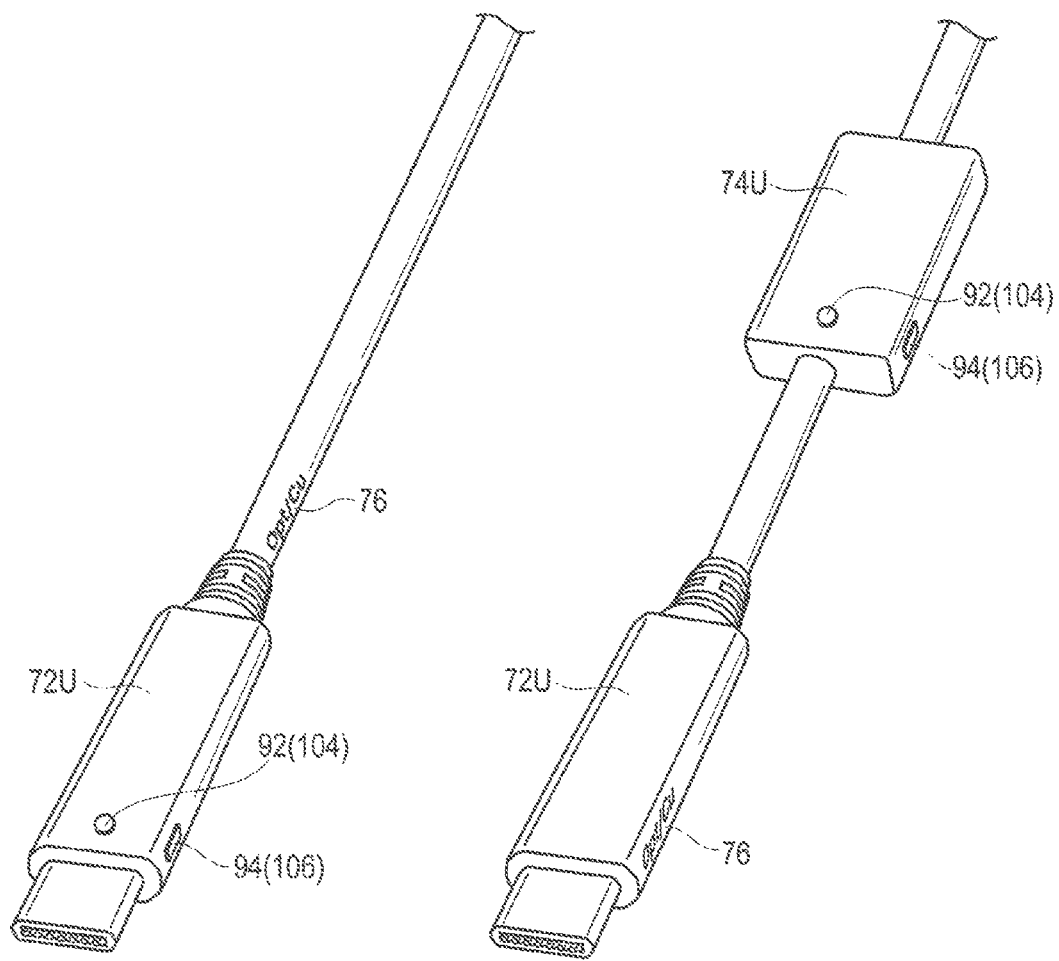
FIG. 10A is a perspective view showing an example of a cable according to another embodiment.
FIG. 10B is a perspective view showing another example of the cable according to the other embodiment.

FIGS. 10A and 10B are perspective views showing an appearance of USB Type-C cables. In the cable shown in FIG. 10A, circuit components including the transmission line selector 62, the lens 88 and the like are accommodated in a source side plug 72U. In the example shown in FIG. 10B, a selector unit 74U is provided near (for example, 5 to 10 cm from) the plug 72U and circuit components including the transmission line selector 62, the lens 88 and the like are accommodated in the selector unit 74U. The LED 92 or 104 and the buzzer 94 or 106 are formed on the surface of the plug 72U or the selector unit 74U. The mark (letter Opt/Cu) 76 by which the cable of the embodiments can be identified may be attached to at least one of a cable main body (FIG. 10A), the plug 72U (FIG. 10B), and the selector unit 74u, similarly to the first embodiment.

The same advantages as those of the above-explained embodiments can be obtained by comprising the first transmission line L1 composed of a copper wire and the second transmission line L2 in the USB Type-C cable and selecting the transmission line similarly to the above-explained embodiments.

As the USB Type-C Alternate modes, not only HDMI Alternate mode but the other Alternate modes, for example, DisplayPort Alternate mode, MHL Alternate mode, Thunderbolt Alternate mode and the like can be used.

[Modified Example]

According to the HDMI interface, it is possible to connect the source device and the sink device by the cable as shown in, for example, FIG. 1 but it is also possible to connect one or more repeaters between the source device and the sink device, the repeaters being connected by cables. The repeater includes a function of the sink device and a function of the source device together, operates as a sink device for the source device and operates as a source device for the sink device. This example is the same as the first embodiment with respect to a feature that the cable 60 is connected between the repeater operating as a source device and the repeater operating as a sink device.

The embodiments can be applied not only to HDMI, but the other video interfaces, for example, DisplayPort, MHL, HD BaseT, VbyOne, Thunderbolt and the like.

The present invention is not limited to the embodiments described above, and the constituent elements of the invention can be modified in various ways without departing from the spirit and scope of the invention. Various aspects of the invention can also be extracted from any appropriate combination of constituent elements disclosed in the embodiments. Some of the constituent elements disclosed in the embodiments may be deleted. Furthermore, the constituent elements described in different embodiments may be arbitrarily combined.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A cable comprising:
a converter, supplied with power from at least one of a first electronic apparatus and a second electronic apparatus, configured to convert an electric signal received from the first electronic apparatus into an optical signal;
a first transmission line configured to transmit the electric signal to the second electronic apparatus;
a second transmission line configured to transmit the optical signal to the second electronic apparatus; and
a selector supplied with the power from at least one of the first electronic apparatus and the second electronic apparatus, configured to select one of transmission of the electric signal via the first transmission line and transmission of the optical signal via the second transmission line, based on an ability to supply the power by at least one of the first electronic apparatus and the second electronic apparatus.

2. The cable of claim 1, wherein
the ability to supply the power is determined by using a display data channel.

3. The cable of claim 1, wherein
the ability to supply the power is determined based on extended display identification data.

4. The cable of claim 1, wherein
the ability to supply the power is determined based on a result of an attempt to supply the power by at least one of the first electric apparatus and the second electric apparatus.

5. The cable of claim 1, wherein
the selector selects one of the transmission of the electric signal via the first transmission line and the transmission of the optical signal via the second transmission line, based on the ability to supply the power by at least one of the first electronic apparatus and the second electronic apparatus and a frequency of the electric signal.

6. The cable of claim 1, wherein
the selector selects one of the transmission of the electric signal via the first transmission line and the transmission of the optical signal via the second transmission line, based on the ability to supply the power by at least one of the first electronic apparatus and the second electronic apparatus and a frequency band of the electric signal.

7. The cable of claim 1, wherein
the selector selects one of the transmission of the electric signal via the first transmission line and the transmission of the optical signal via the second transmission line, based on the ability to supply the power by at least one of the first electronic apparatus and the second electronic apparatus, an error rate of the first transmission line, and an error rate of the second transmission line.

8. The cable of claim 1, wherein
the selector selects one of the transmission of the electric signal via the first transmission line and the transmission of the optical signal via the second transmission line, based on the ability to supply the power by at least one of the first electronic apparatus and the second electronic apparatus and whether the electric signal is a DC signal or an AC signal.

9. The cable of claim 1, wherein
the selector selects one of the transmission of the electric signal via the first transmission line and the transmission of the optical signal via the second transmission line, based on the ability to supply the power by at least one of the first electronic apparatus and the second electronic apparatus and a transmission mode defined in USB Type-C alternate mode.

10. The cable of claim 1, further comprising:
a mark configured to identify the cable and a second cable including the first transmission line and not including the second transmission line.

11. The cable of claim 1, further comprising:
a first signal output circuit configured to output a first signal to at least one of the first electronic apparatus and the second electronic apparatus, the first signal for displaying a visually recognizable indication to identify the cable and a second cable including the first transmission line and not including the second transmission line.

12. The cable of claim 1, further comprising:
a second signal output circuit configured to output a second signal, the second signal for outputting a first sound when the electric signal is transmittable by the first transmission line and a second sound different from the first sound when the optical signal is transmittable by the second transmission line.

13. The cable of claim 1, further comprising:
a light emitting device configured to emit light in a first mode when the electric signal is transmittable via the first transmission line and emit light in a second mode different from the first mode when the optical signal is transmittable via the second transmission line.

14. An electronic apparatus connectable to a cable comprising a first transmission line configured to transmit an electric signal and a second transmission line configured to transmit an optical signal and capable of receiving the electric signal transmitted by the cable, the electronic device comprising:
a terminal connectable to a cable comprising a first transmission line configured to transmit an electric signal and a second transmission line configured to transmit an optical signal, the optical signal is generated by converting the electric signal;
circuitry configured to output a signal regarding a first transmission mode or a second transmission mode to the cable, wherein
the first transmission mode consumes more amounts of power than the second transmission mode,
if the electronic apparatus is in the first transmission mode, power for converting the electric signal into the optical signal is supplied to the cable and the optical signal is transmitted via the second transmission line, and
if the electronic apparatus is in the second transmission mode, the electric signal is transmitted via the first transmission line.

15. An electronic apparatus connectable to a cable comprising a first transmission line configured to transmit an electric signal and a second transmission line configured to transmit an optical signal and capable of supplying the electric signal to the cable, the electronic device comprising:
- a terminal connectable to a cable comprising a first transmission line configured to transmit an electric signal and a second transmission line configured to transmit an optical signal, the optical signal is generated by converting the electric signal;
- circuitry configured to output a signal regarding a first transmission mode or a second transmission mode to the cable, wherein
- the first transmission mode consumes more amounts of power than the second transmission mode,
- if the electronic apparatus is in the first transmission mode, power for converting the electronic signal into the optical signal is supplied to the cable and the optical signal is transmitted via the second transmission line, and
- if the electronic apparatus is in the second transmission mode, the electric signal is transmitted via the first transmission line.

* * * * *